(12) United States Patent
Anilovich et al.

(10) Patent No.: US 8,620,516 B2
(45) Date of Patent: Dec. 31, 2013

(54) SYSTEM AND METHOD FOR PERFORMING ENGINE MATERIAL TEMPERATURE SENSOR DIAGNOSTICS

(75) Inventors: Igor Anilovich, Walled Lake, MI (US); Daniel A. Bialas, Ann Arbor, MI (US); Morena Bruno, Chivasso Torino (IT); John W. Siekkinen, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 406 days.

(21) Appl. No.: 13/029,538

(22) Filed: Feb. 17, 2011

(65) Prior Publication Data

US 2012/0215397 A1 Aug. 23, 2012

(51) Int. Cl.
*G06F 19/00* (2011.01)
(52) U.S. Cl.
USPC .......................................... 701/30.8; 701/34.4
(58) Field of Classification Search
USPC ............... 701/30.8, 34.4, 22, 102; 123/41.01, 123/41.1, 41.44, 41.09, 41.02, 41.05, 41.57, 123/41.58; 165/287, 51, 266; 180/65.265
See application file for complete search history.

(56) References Cited

U.S. PATENT DOCUMENTS

| | | | | |
|---|---|---|---|---|
| 2002/0152972 A1* | 10/2002 | Iwasaki et al. | ............. | 123/41.44 |
| 2003/0089319 A1* | 5/2003 | Duvinage et al. | .......... | 123/41.02 |
| 2005/0028756 A1* | 2/2005 | Santanam et al. | ........... | 123/41.1 |
| 2011/0265740 A1* | 11/2011 | Hoshi et al. | ................ | 123/41.01 |
| 2011/0265742 A1* | 11/2011 | Choi et al. | ................. | 123/41.09 |

FOREIGN PATENT DOCUMENTS

JP  2007192045 A  *  8/2007  .............. F02D 45/00

* cited by examiner

*Primary Examiner* — Marthe Marc-Coleman
(74) *Attorney, Agent, or Firm* — Quinn Law Group, PLLC

(57) ABSTRACT

A diagnostic system for performing engine material temperature sensor diagnostics includes a coolant flow sensor configured to provide an indication of coolant flow within a coolant system; an engine state sensor configured to provide an indication of an operational state of an internal combustion engine; and a diagnostic module in communication with the coolant flow sensor and engine state sensor. The diagnostic module is configured to use the indication of coolant flow and the indication of an operational state of the internal combustion engine to estimate an amount of accumulated energy within the internal combustion engine.

15 Claims, 3 Drawing Sheets

SYSTEM AND METHOD FOR PERFORMING ENGINE MATERIAL TEMPERATURE SENSOR DIAGNOSTICS

TECHNICAL FIELD

The present invention relates generally to diagnostic routines for assessing the rationality of engine material temperature sensors.

BACKGROUND

Diagnostic routines are used within vehicle systems, such as within automobile systems, to assure the proper function of sensors that may be needed for various control processes. A diagnostic routine may be used to periodically perform a rationality check on the sensor and ensure that the sensor is providing a reading within an expected range and/or is not stuck or lagging the true system dynamics.

In internal combustion engines, temperature sensors may be used to monitor the operating temperature of particular components. These sensors may be configured to adjust the combustion process in manners that may reduce the production of certain nitrogen oxide bi-products that are created only at high combustion temperatures. Additionally, the material temperature sensors may be used to initiate primary or auxiliary cooling processes if the material temperature begins to substantially increase. Within such systems, it is desirable for the material temperature sensors to register and/or provide accurate readings.

SUMMARY

A vehicle system may include an internal combustion engine that is configured to selectively assume one of a plurality of operational states. The operational states may include, for example, an engine-running state and an auto-stop state. The internal combustion engine may be provided with a coolant system that is configured to have a variable coolant flow, such as provided by an electric water pump or a selectively engagable switchable water pump, and may include a temperature sensor configured to monitor a material temperature of a portion of the engine.

The vehicle may include a computer implemented diagnostic module for assessing the rationality of the temperature sensor. The diagnostic module may be in communication with the internal combustion engine and with the coolant system, and may be configured to monitor the coolant flow of the coolant system and the operational state of the internal combustion engine. The diagnotstic module may further be configured to estimate an amount of accumulated energy within the internal combustion engine. The diagnostic module may also be in communication with the temperature sensor and configured to receive an indication of the monitored material temperature.

In an embodiment, the computer implemented diagnostic module may assess the rationality of the temperature sensor by relating the indication of monitored material temperature to the estimate of accumulated energy within the internal combustion engine. In another embodiment, the diagnostic module may be configured to compare the indication of monitored material temperature to a temperature threshold, compare the estimate of accumulated energy to an energy threshold, and determine that the temperature sensor is rational if the indication of monitored material temperature exceeds the temperature threshold before the estimate of accumulated energy exceeds the energy threshold. The diagnostic module may be operative to increase the estimate of accumulated energy in response to an engine-running operating state (with and without coolant flow), and to decrease the estimate of accumulated energy in response, for example, to a transition from "no coolant flow" to a coolant flow. Additionally, the module may count the number of times the estimate of accumulated energy exceeds the first threshold to provide rate-based functionality.

A method of performing diagnostics on the engine material temperature sensor may include monitoring an operational state of the internal combustion engine, monitoring the flow of coolant in a coolant system associated with the internal combustion engine, and monitoring a temperature signal from the engine material temperature sensor. A diagnostic module may estimate an amount of accumulated energy within the internal combustion engine using the operating state of the internal combustion engine and the flow of coolant in the coolant system. The module may assess the rationality of the temperature signal using the estimated amount of accumulated energy.

In an embodiment, the diagnostic module may assess the rationality of the temperature signal by comparing the estimate of accumulated energy to an energy threshold, comparing the temperature signal to a temperature threshold, and determining that the temperature signal is rational if the temperature signal exceeds the temperature threshold before the estimate of accumulated energy exceeds the energy threshold. Additionally, estimating an amount of accumulated energy may include first providing a baseline energy value, and then increasing the energy value in response to an engine running operating state, and/or decreasing the energy value in response to a transition from "no coolant flow" to a sensed coolant flow.

The above features and advantages and other features and advantages of the present invention are readily apparent from the following detailed description of the best modes for carrying out the invention when taken in connection with the accompanying drawings.

DETAILED DESCRIPTION

Figure 1:
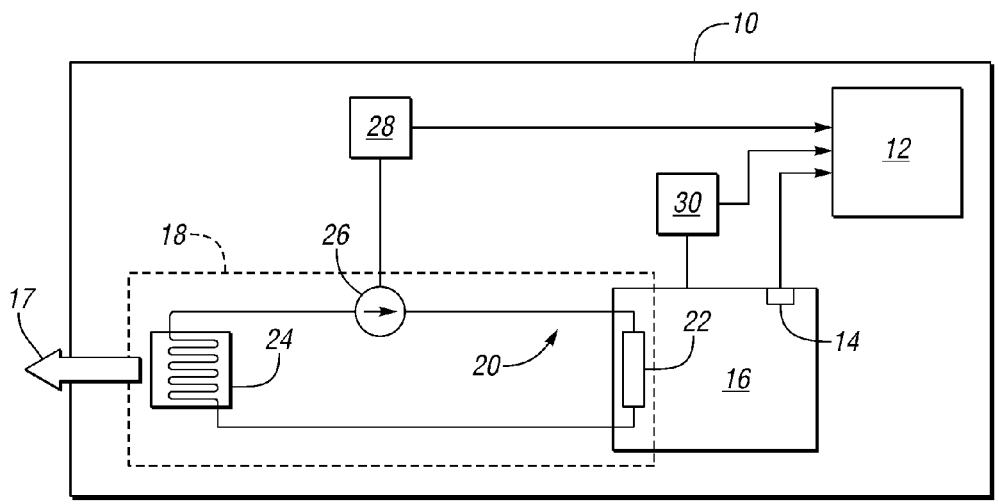
FIG. 1 is a schematic diagram of a vehicle having a diagnostic module for assessing the rationality of an engine material temperature sensor.

Referring to the drawings, wherein like reference numerals are used to identify like or identical components in the various views, FIG. 1 is a schematic diagram of a vehicle system 10 having a computer implemented diagnostic module 12 for assessing the rationality of an engine material temperature ("EMT") sensor 14. In an embodiment, the vehicle system 10, may include, for example, a vehicle powertrain system, which may be disposed within an automotive vehicle. The vehicle system 10 may include an internal combustion engine ("ICE") 16 that may provide a propulsion force to the vehicle by combusting fuel in a manner generally known in the art. Exemplary fuels may include diesel fuel, gasoline, ethanol, methanol, hydrogen, or natural gas. The ICE 16 may be used either alone or in conjunction with various configurations of electric drives, such as in a hybrid powertrain configuration.

During the combustion process, the ICE 16 may generate a substantial amount of thermal energy 17 that may be removed using a cooling system 18. The cooling system 18 may include a fluid circuit 20, which fluidly couples a heat exchanger 22 of the ICE 16 to a radiator 24 outside of the ICE 16. Cooling fluid may be circulated within the circuit 20 using a water pump 26 that may be provided in a series configuration with the circuit 20. The cooling fluid may absorb heat from the ICE 16 via the heat exchanger 22, and carry it through the circuit to a more suitable location where it may be transferred to the environment using the radiator 24.

The water pump 26 may be selectively actuated by a pump controller 28 and may provide for a controllably variable coolant flow within the circuit 20. In an embodiment, the water pump 26 may be a switchable water pump that may be selectively driven through a clutch-based coupling with a rotational shaft of the ICE 16. Exemplary clutch-based couplings may include, but are not limited to, hydraulic clutches, electromagnetic clutches, and viscous clutches, though may also include other clutches known in the art. In another embodiment, the water pump 26 may be electrically driven, with its pumping speed (and correspondingly fluid flow) being proportional to an applied voltage or frequency. As may be appreciated, the cooling system 18 may extract thermal energy from the ICE 16 at a rate proportional to the fluid flow within the circuit 20.

Figure 2:
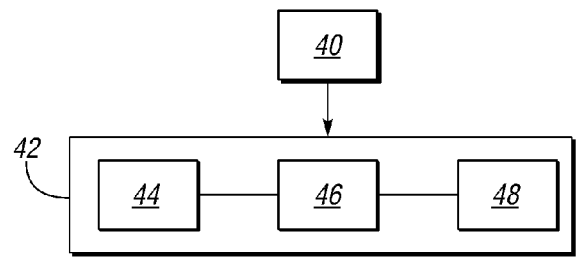
FIG. 2 is schematic state diagram for an internal combustion engine configured to assume one of a plurality of engine states.

As generally illustrated in FIG. 2, following a key-on event 40, which may be performed by an operator, the ICE 16 may selectively assume one of a plurality of operational states 42. The selection of the active operational state may be performed by an engine state controller 30 (shown in FIG. 1), and the active state may describe the behavior of the ICE 16. Exemplary operational states 42 may include an engine-running state 44, an auto-stop state 46, a deceleration fuel cut-off (DFCO) state 48, or other reduced-power or modified operational states (not shown). During an engine-running state 44, the ICE 16 may combust fuel under normal operating conditions to produce a drive torque. Conversely, during an auto-stop state 46 or DFCO state 48, the engine may not be actively combusting fuel.

An auto-stop state 46 may represent a temporary engine-off state where the crank shaft of the engine may cease rotation. The ICE 16 may assume an auto-stop state 46, for example, when the vehicle comes to a momentary rest, such as at a traffic light. As such, the ICE 16 may freely transition back to an engine-running state 44 without a subsequent key-on event 40 being performed by an operator.

A DFCO state 48 may result when the ICE 16 temporarily stops the flow of fuel to the cylinders. In a DFCO state, the crank shaft may continue to rotate (either through the inertia of the vehicle, or through an auxiliary drive means), and air may continue to flow into, and exhaust from the cylinders, however combustion will be absent due to the lack of fuel.

Figure 3:
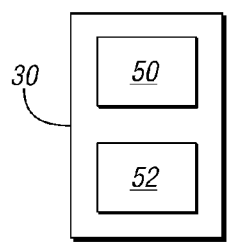
FIG. 3 is a schematic diagram of an exemplary coolant pump controller.

As illustrated in FIG. 3, the engine state controller 30 may include control functionality 50 and an engine state sensor 52. In an embodiment, the control functionality 50 may be configured to transition the ICE 16 between the various operational states 42 (shown in FIG. 2). Likewise, the engine state sensor 52 may provide an indication of which operational state is currently active. In an embodiment, the sensing functionality 52 may include one or more hardware sensors configured to physically sense the behavior of the ICE 16. In another embodiment, the sensing functionality 52 may include a software sensor that may be configured to inspect the control functionality 50, or a related software bit, register, or variable.

Figure 4:
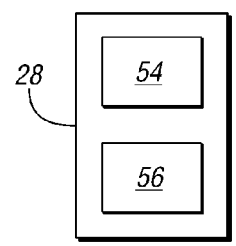
FIG. 4 is a schematic diagram of an exemplary engine state controller.

Similar to the engine controller 30, as shown in FIG. 4, the pump controller 28 may likewise include a control functionality 54 and a coolant flow sensor 56. The control functionality 54 may selectively vary the coolant flow within the fluid circuit 20, for example, by engaging a switchable clutch, or by controlling the voltage and/or current applied to a pump motor. Additionally, the coolant flow sensor 56 may be configured to provide an indication of coolant flow within the coolant system 18. In an embodiment, the coolant flow sensor 56 may include a hardware flow sensor configured to physically sense the coolant flow. In another embodiment, the coolant flow sensor 56 may include a software sensor that may be configured to inspect the control functionality 54, or a related software bit, register, or variable. When configured with a software sensor, the "sensor" may infer coolant flow through the operational status of the pump.

Referring again to FIG. 1, the computer implemented diagnostic module 12 may be embodied as a software/firmware routine executed by one or multiple digital computers, embedded controllers, or other data processing or computing devices. Each computing device or controller may include one or more microprocessors or central processing units (CPU), read only memory (ROM), random access memory (RAM), electrically-erasable programmable read only memory (EEPROM), high-speed clock, analog-to-digital (A/D) circuitry, digital-to-analog (D/A) circuitry, and/or any other required input/output (I/O) circuitry or devices that may be needed to perform the diagnostic function.

The computer implemented diagnostic module 12 may be in communication with the coolant system 18 via a pump controller 28, and with the internal combustion engine 16 via an engine controller 30. Using the pump controller 28 and engine controller 30, the diagnostic module 12 may respectively be configured to sense and/or monitor the coolant flow within the coolant system 18, along with the operational state of the ICE 16. Using the monitored coolant flow and the operational state of the ICE 16, the diagnostic module 12 may be configured to estimate an amount of accumulated energy within the ICE 16. This estimate may be based on the assumption that an operational state 42 involving combustion (e.g., an engine-running state 44) may cause an accumulation of energy within the ICE 16, and the existence of a coolant flow may remove accumulated energy from the ICE 16. This relationship is expressed, for example, in Equation 1, where $E_{Generated}$ represents an amount of energy generated by combustion, and $E_{Removed}$ represents an amount of energy removed through the cooling system 18.

$$E_{Total} = E_{Generated} - E_{Removed} \quad \text{Equation 1}$$

The estimate of the amount of accumulated energy within the ICE may be used to assess the rationality of a temperature sensor associated with the ICE 16 (e.g., EMT sensor 14). For example, the accumulated energy from a baseline value may be used to compute an expected temperature rise of the ICE 16 during a corresponding time period. If the temperature sensor 14 does not register a corresponding temperature increase, the system may indicate that the temperature reading is not rational.

Figure 5:
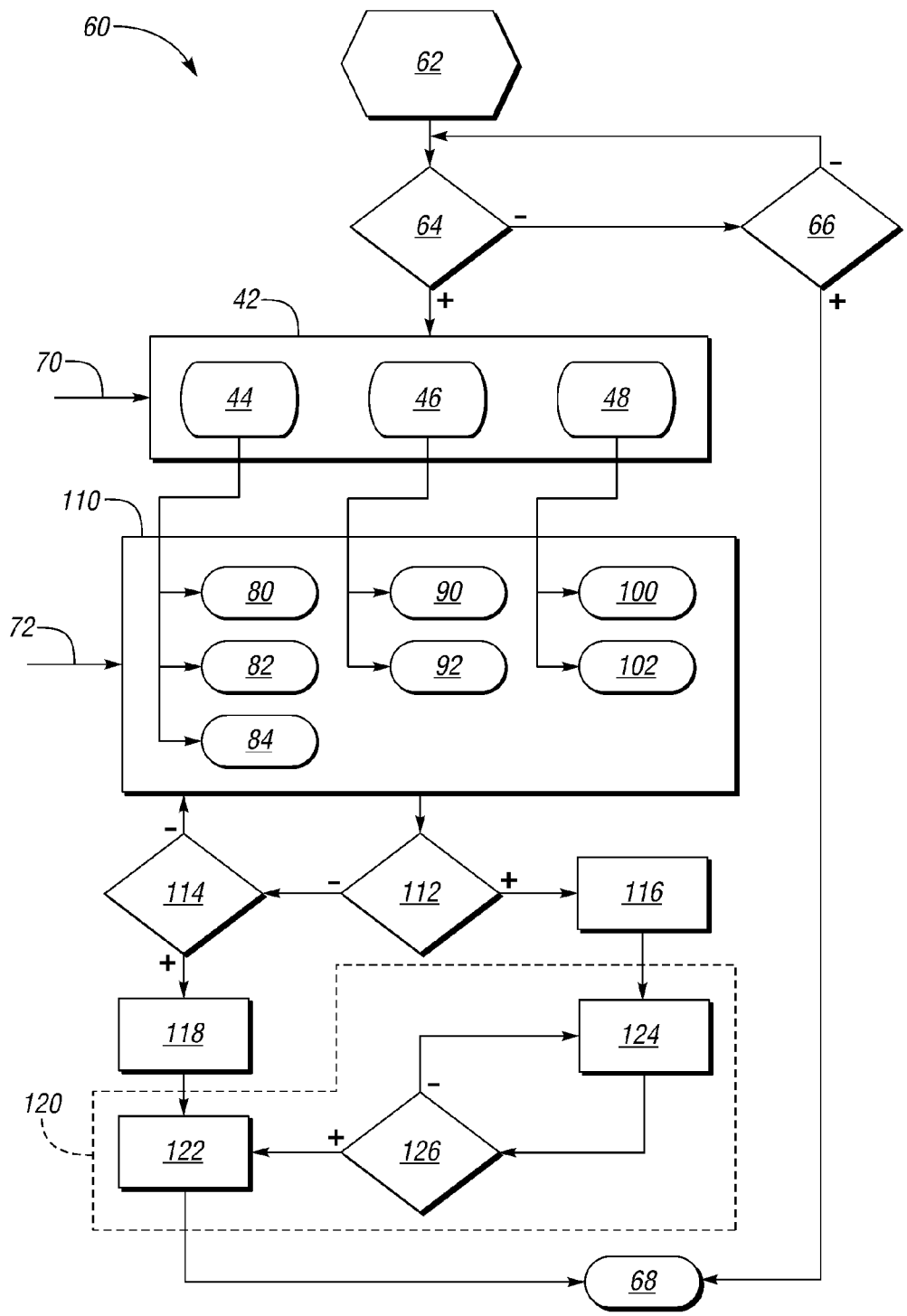
FIG. 5 is an exemplary flow diagram for assessing the rationality of an engine material temperature sensor.

In an embodiment, the diagnostic module 12 may assess the rationality of a temperature sensor associated with the ICE 16 using a diagnostic routine 60 such as illustrated in FIG. 5. As shown, the diagnostic routine 60 may begin at 62 with a key-on event, which may be performed by a vehicle occupant. The key-on event may place the vehicle in a run-time configuration where the various vehicle systems may be energized and/or initialized.

After the routine 60 is initialized through a key-on event 62, it may check to see if an EMT test is enabled at 64. If a test has not been enabled, the routine 60 may check to see if the test is disabled for the duration of the trip at 66. If the test has been disabled at 66, then the routine 60 may end at 68, otherwise, it may loop back to the EMT test at 64.

If the routine 60 detects that the EMT test is enabled at 64, the routine 60 may then use an indication of the operational state 70 that may be provided by the engine state controller 30 to selectively choose one engine state from a plurality of existing operational states 42. While FIG. 5 illustrates three operational states (engine-running 44, auto-stop 46, and DFCO 48), more or fewer states may be included in the routine 60 based on the configuration of the ICE 16.

Once an operational state 42 is selected, the routine may then receive an indication of coolant flow 72 from a coolant flow sensor 56 in communication with the diagnostic module 12. While FIG. 5 illustrates a routine 60 that is configured for a water pump 26 with only an on-state (e.g., states 80, 90, or 100), an off-state (e.g., states 82, 92, 102), or a transition/stirring state (e.g., state 84), the routine 60 may alternatively be adapted for a continuously variable pump. The routine 60 may use the received indications of ICE operating state 70, and coolant flow 72 to determine an incremental change in accumulated energy, which it may add to a running energy total ($E_{Total}$).

For cases where the coolant is flowing and the engine is not combusting (e.g., states 90, and 100), the net energy accumulation may be negative (i.e., energy is being extracted from the ICE 16). For cases where the coolant is not flowing and the engine is combusting fuel (e.g. state 82), the net energy accumulation may be positive (i.e., energy is being released via combustion but not removed from the ICE 16 by the coolant system 18). To further explain the net energy flow for each operational state/coolant flow combination, the routine 60 may select a different applicable formula and/or value from a lookup table at each state.

For example, at state 80 (engine-running, coolant flowing), the incremental energy flow ($K_1$) may be positive or negative and may be characterized by engine power. At state 82 (engine-running, coolant not flowing), the incremental energy flow ($K_2$) may be positive and may be characterized by engine power. At state 84 (engine-running, coolant transitioning from "no flow" to flow), the incremental energy flow ($K_3$) may be negative and may be characterized by engine power. At state 90 (auto-stop, coolant flowing), the incremental energy flow ($K_4$) may be negative and may be characterized by vehicle speed, and coolant temperature. At state 92 (auto-stop, coolant not flowing), the incremental energy flow ($K_5$) may be negative and may be characterized by vehicle speed, and coolant temperature. At state 100 (DFCO, coolant flowing), the incremental energy flow ($K_6$) may be negative and may be characterized by vehicle speed, and coolant temperature. At state 102 (DFCO, coolant not flowing), the incremental energy flow ($K_7$) may be negative and may be characterized by vehicle speed, and coolant temperature.

In each of the preceding states ($K_1$-$K_7$), the particular K value may be determined, for example, through off-line empirical testing data and/or modeling, and may be stored in look-up tables within the diagnostic module 12 for quick access. The relationship between the accumulated energy and an expected temperature or expected temperature change may likewise be either empirically or analytically determined.

Once the incremental energy change is determined generally at 110, the diagnostic module 12 may then be configured to compare an indication of monitored material temperature ($EMT_{Temp}$) from the EMT sensor 14 to a temperature threshold ($T_{Target}$) at 112, and as generally represented by Equation 2. Similarly, the diagnostic module 12 may be configured to compare the estimate of accumulated energy ($E_{Total}$) to an energy threshold ($E_{Limit}$) at 114, and as generally represented by Equation 3.

$$EMT_{Temp} \geq T_{Target} \qquad \text{Equation 2}$$

$$E_{Total} \geq E_{Limit} \qquad \text{Equation 3}$$

An exemplary temperature threshold ($T_{Target}$) for a temperature sensor 14 positioned in the cylinder head of an ICE 16 may be 110 degrees Celsius. For a 20 degree Celsius starting temperature, an exemplary amount of energy that may be required to reach the 110 degree temperature limit may be approximately 6000 kJ. Therefore, this amount may also be used as the corresponding energy threshold ($E_{Limit}$).

In an embodiment, the EMT temperature sensor 14 may be considered to be providing a "rational" signal if the indication of monitored material temperature exceeds the temperature threshold before the estimate of accumulated energy exceeds the energy threshold (at 116). Conversely, if the estimate of accumulated energy exceeds the energy threshold before the indication of monitored material temperature exceeds the temperature threshold (at 118), the EMT temperature sensor 14 may be considered to be providing an "irrational" signal.

An "irrational" signal may occur, for example, if the temperature sensor 14 stops providing a temperature signal, or if it becomes slow to respond. In either case, the estimate of accumulated energy ($E_{Total}$) crossing energy threshold ($E_{Limit}$) may indicate that the engine has run for a long enough time in a heat-generating state that a corresponding temperature rise should be expected. If the temperature rise is not witnessed, then the routine may initiate a service procedure concurrently at 118.

Following the indication of "rational" (at 116) or "irrational" (at 118), the routine 60 may be configured to perform rate based functionality at 120. For example, if the routine 60 registers an "irrational" sensor occurrence at 118, it may subsequently increment a rate-based count at 122. If the routine 60, however, registers a "rational" reading at 116, it may subsequently update the estimate of accumulated energy ($E_{Total}$) at 124, and then compare $E_{Total}$ to the energy threshold ($E_{Limit}$) at 126, such as with Equation 3. Once $E_{Total}$ exceeds $E_{Limit}$, the routine 60 may increment the rate-based count at 122. The rate-based count may therefore represent the number of times the routine 60 may have run where a sensor irrationality may have been detected.

After the rate based count has been incremented at 122, the routine 60 ends at 68. In an embodiment, the routine 60 is not re-started until the next subsequent key-on event 62 occurs. The present diagnostic routine 60 has the benefit of being able to run regardless of the operational state 42 of the ICE 16, and therefore, may fully execute regardless of whether the engine is in an engine-on state, or an auto-stop state, as long as the key is engaged.

Figure 6:
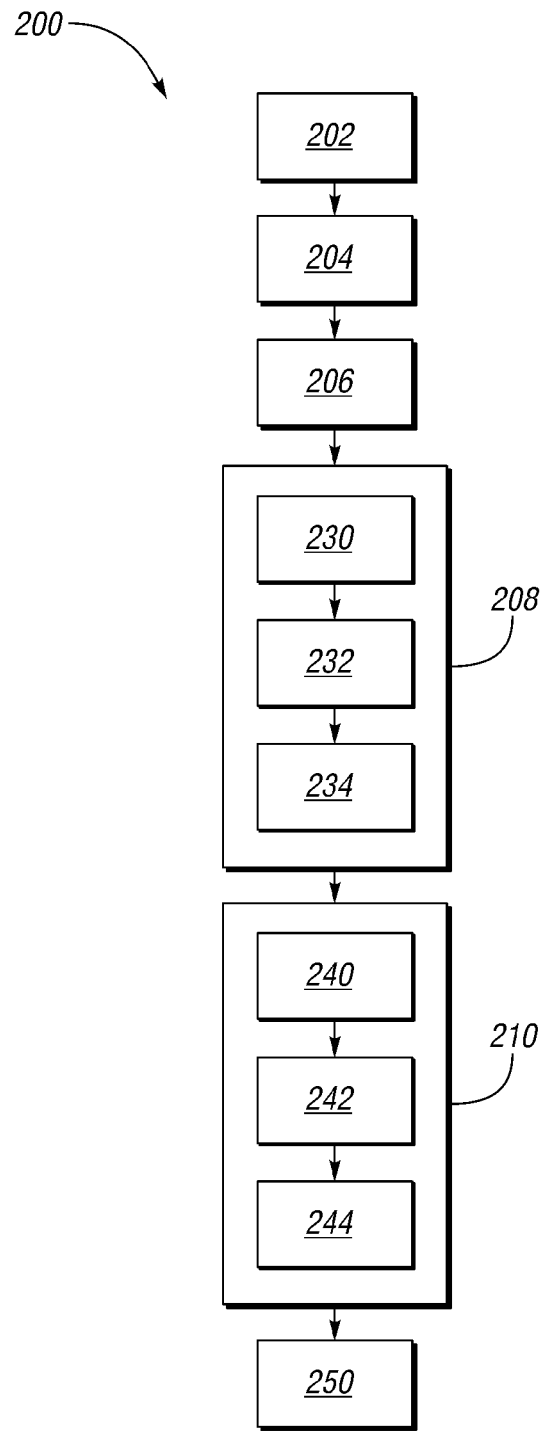
FIG. 6 is a flow diagram illustrating an exemplary method for assessing the rationality of an engine material temperature sensor.

FIG. 6 illustrates an exemplary method 200 of performing diagnostics on an engine material temperature sensor that may be associated with an ICE 16. As shown, the method 200 may include monitoring an operational state of the ICE 16 (Step 202), monitoring the flow of coolant in a coolant system 18 that is associated with the ICE 16 (Step 204); and monitoring a temperature signal from a temperature sensor 14 (Step 206). Using the monitored operational state and coolant flow, the diagnostic module 12 may estimate an amount of accumulated energy within the ICE 16 (Step 208), and then may assess the rationality of the monitored temperature signal using the estimated energy (Step 210).

As generally described with respect to FIG. 5, the diagnostic module 12 may estimate the amount of accumulated energy within the ICE 16 (Step 208), for example, by providing an energy value (Step 230), and then increasing the energy value in response to an engine running operating state (Step 232) and/or decreasing the energy value in response to a sensed coolant flow (Step 234). Likewise the diagnostic module 12 may assess the rationality of the temperature signal (Step 210), for example, by comparing the temperature signal to a temperature threshold (Step 240), comparing the estimate of accumulated energy to an energy threshold (Step 242), and then determining the temperature signal is rational if the temperature signal exceeds the temperature threshold before the estimate of accumulated energy exceeds the energy threshold (Step 244). Finally, the diagnostic module 12 may count the number of times the estimate of accumulated energy exceeds the energy threshold to provide a rate-based functionality (Step 250).

While the best modes for carrying out the invention have been described in detail, those familiar with the art to which this invention relates will recognize various alternative designs and embodiments for practicing the invention within the scope of the appended claims. All directional references (e.g., upper, lower, upward, downward, left, right, leftward, rightward, above, below, vertical, and horizontal) are only used for identification purposes to aid the reader's understanding of the present invention, and do not create limitations, particularly as to the position, orientation, or use of the invention. It is intended that all matter contained in the above description or shown in the accompanying drawings shall be interpreted as illustrative only and not as limiting.

The invention claimed is:

1. A vehicle system comprising:
    an internal combustion engine configured to selectively assume one of a plurality of operational states;
    a coolant system provided with the internal combustion engine and having a variable coolant flow;
    a temperature sensor provided with the internal combustion engine and configured to monitor a material temperature of a portion of the engine; and
    a computer implemented diagnostic module in communication with the internal combustion engine, with the temperature sensor, and with the coolant system, the diagnostic module configured to:
        receive an indication of the monitored material temperature;
        monitor the coolant flow of the coolant system;
        monitor the operational state of the internal combustion engine; and
        estimate an amount of accumulated energy within the internal combustion engine from the monitored coolant flow and operational state of the internal combustion engine;
        compare the estimated amount of accumulated energy to a first threshold;
        compare the indication of monitored material temperature to a second threshold; and
        determine that the temperature sensor is rational if the indication of monitored material temperature exceeds the second threshold before the estimated amount of accumulated energy exceeds the first threshold.

2. The vehicle system of claim 1, wherein the diagnostic module is configured to relate the indication of monitored material temperature to the estimated amount of accumulated energy within the internal combustion engine.

3. The vehicle system of claim 1, wherein the diagnostic module is further configured to count the number of times the estimated amount of accumulated energy exceeds the first threshold.

4. The vehicle system of claim 1, wherein the coolant system includes a switchable water pump.

5. The vehicle system of claim 1, wherein the plurality of operational states for the internal combustion engine include an engine-running state and an auto-stop state.

6. The vehicle system of claim 5, wherein the diagnostic module is operative to increase the estimated amount of accumulated energy in response to an engine-running operating state, and is operative to decrease the estimated amount of accumulated energy in response to a coolant flow.

7. A diagnostic system comprising:
    a coolant flow sensor configured to provide an indication of coolant flow within a coolant system;
    an engine state sensor configured to provide an indication of an operational state of an internal combustion engine; and
    a computer implemented diagnostic module in communication with the coolant flow sensor and engine state sensor, the diagnostic module configured to:
        estimate an amount of accumulated energy within the internal combustion engine using the indication of coolant flow and the indication of an operational state of the internal combustion engine;
        receive an indication of a temperature of a portion of the internal combustion engine from an engine material temperature sensor;
        compare the estimated amount of accumulated energy to a first threshold;
        compare the indication of a temperature to a second threshold; and
        determine that a sensor reading is rational if the indication of a temperature exceeds the second threshold before the estimated amount of accumulated energy exceeds the first threshold.

8. The system of claim 7, wherein the diagnostic module is configured to relate the indication of a temperature to the estimated amount of accumulated energy within the internal combustion engine.

9. The system of claim 7, wherein the diagnostic module is further configured to count the number of times the estimated amount of accumulated energy exceeds the first threshold.

10. The system of claim 7, wherein the coolant flow sensor is a software sensor.

11. The system of claim 7, wherein the engine state sensor is a software sensor.

12. The system of claim 7, wherein the diagnostic module is operative to increase the estimated amount of accumulated energy in response to a sensed engine-running operating state, and is operative to decrease the estimated amount of accumulated energy in response to a sensed level of coolant flow.

13. A method of performing diagnostics on an engine material temperature sensor associated with an internal combustion engine, the method comprising:
    monitoring an operational state of the internal combustion engine;

monitoring the flow of coolant in a coolant system associated with the internal combustion engine;

monitoring a temperature signal from the engine material temperature sensor;

estimating, via a processor, an amount of accumulated energy within the internal combustion engine from the monitored operating state of the internal combustion engine and the monitored flow of coolant in the coolant system;

assessing the rationality of the temperature signal using the estimated amount of accumulated energy the assessing including:

comparing the estimated amount of accumulated energy to a first threshold;

comparing the temperature signal to a second threshold; and determining that the temperature signal is rational if the temperature signal exceeds the second threshold before the estimated amount of accumulated energy exceeds the first threshold.

14. The method of claim 13, further comprising counting the number of times the estimated amount of accumulated energy exceeds the first threshold.

15. The method of claim 13, wherein estimating an amount of accumulated energy within the internal combustion engine includes:

providing an energy value;

increasing the energy value in response to an engine running operating state; and decreasing the energy value in response to a sensed coolant flow.

* * * * *